United States Patent Office 3,212,613
Patented Oct. 19, 1965

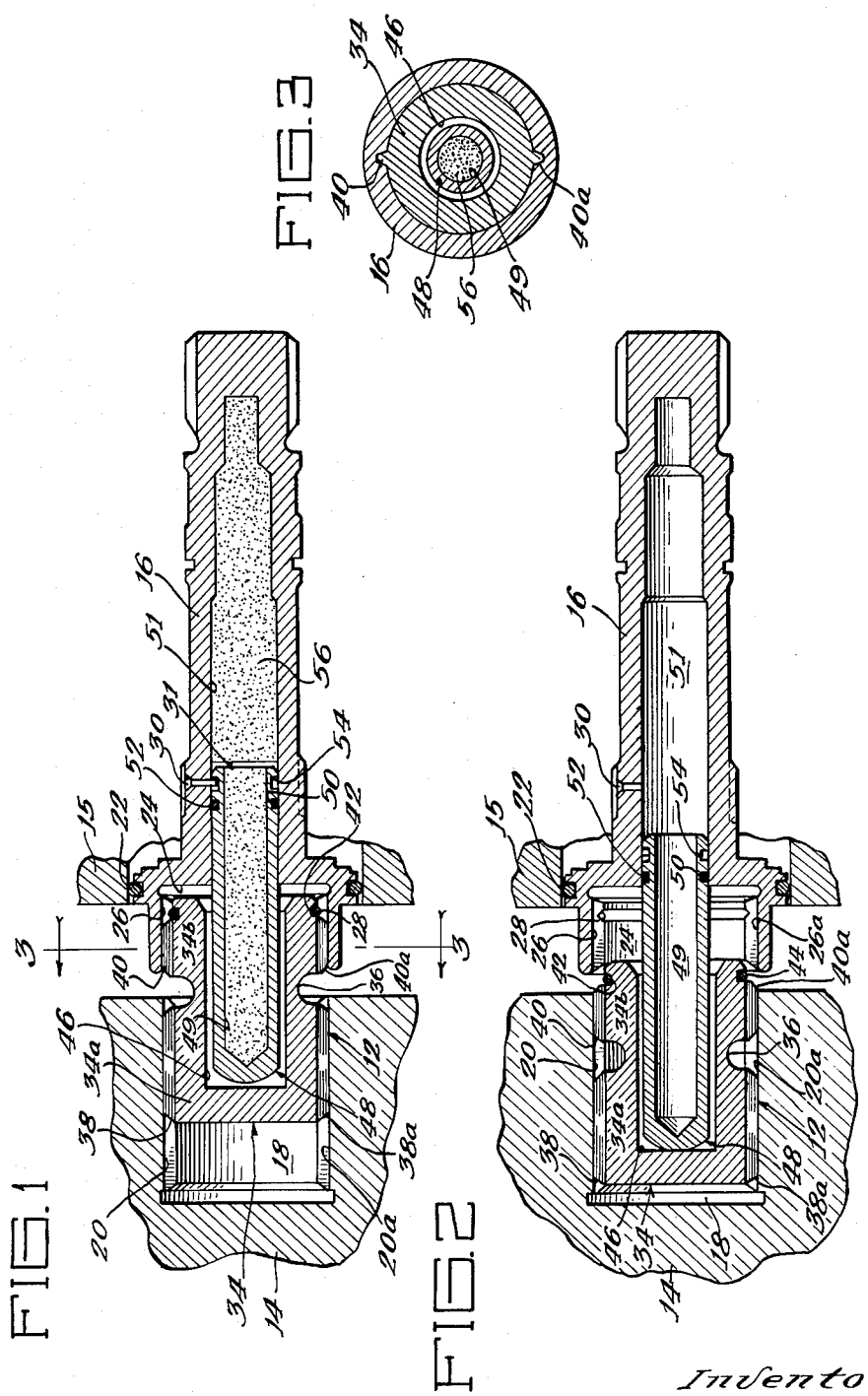

3,212,613
THERMAL DISCONNECT
Donald A. Carlson, Rockford, Ill., assignor to Sundstrand Corporation, a corporation of Illinois
Filed July 6, 1962, Ser. No. 207,889
16 Claims. (Cl. 192—101)

This invention relates to disconnect devices and more particularly to a thermal disconnect device for a use in a power transmission system.

In power transmission systems it is desirable to have a means for disconnecting the driving and driven members in response to excessive heat generated within the system. If the driving connection is allowed to continue after a critical temperature is achieved there may be extensive damage caused within the transmission system. Preferably such a disconnect device should be capable of operably disengaging the driving and driven members at any speed, and in such a manner that no excessive loading will be transmitted to the driving mechanism during or after the disconnecting period. Furthermore, it is preferable that the disconnecting device use the heat generated within the transmission system as the actuation for the disengagement and that it be accurately responsive to the critical temperature which may cause damage within the system.

It is, therefore, an object of this invention to provide a new and improved disconnect device for use in a power transmission system.

It is another object of this invention to provide a new and improved disconnect device for use in a power transmission system which will disconnect at any speed and will not result in an excessive load being applied to the driving member of the system.

It is still another object of this invention to provide a new and improved disconnect device with a power transmission system which is accurately responsive to heat generated within the system and will disengage the driving and driven members therein in response to the aforementioned heat.

It is a further object of this invention to provide a new and improved disconnect device for use in a power transmission system including a driving member, a driven member, coupling means coupled to the driven member to be driven by the driving member, means movable to disengage the coupling means, a member for moving the movable means to disengage the means for moving including a temperature responsive solid, and means connecting the temperature responsive solid to the movable means to disengage the coupling when the temperature thereof exceeds a predetermined figure.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

FIGURE 1 is a section view of a preferred embodiment of this invention in operable engagement in a power transmission system;

FIGURE 2 is a fragmentary section view similar to FIGURE 1 of the preferred embodiment of this invention after disengagement in response to thermal actuation of the power transmission system; and FIGURE 3 is a section view taken along the line 3—3 of FIGURE 1.

As shown in FIGURES 1 and 2, the disconnect device 12 of this invention is preferably embodied in a power transmission system consisting of a driving member 14 and a driven member 16. The disconnect means 12 is adapted to be responsive to critical temperatures within the power transmission system and terminate the operable engagement between the driving member and the driven member upon the attainment of such critical temperatures to prevent damage which may occur if further operational engagement therebetween is permitted to continue.

The driving member 14 may be any appropriate element transmitting a rotational force about a given center. Formed in the driving member 14 coaxially with the center of rotation is a coupling means driving aperture 18. The driving aperture 18 is a female element or cavity of generally circular cylindrical configuration. A pair of longitudinal slots 20 and 20a are formed in the interior of the walls of the driving aperture 18 and extend generally parallel to the axis thereof. The slots 20 and 20a are adapted to mate with the key portions 38 and 38a of the coupling means 34 to transmit the rotational force of the driving member 14 thereto while permitting lateral movement of the coupling means 34 relative to the driving member 14 within the aperture 18.

The driven member 16 is rotatably mounted in a housing 15 by means of bearings 22 and is adapted to rotate in response to the rotational force transmitted thereto from the driving member 14. Formed at one end of the driven member 16 and facing outwardly opposed to the aperture 18 is a coupling means receiving aperture 24. This aperture is a female element of generally circular cylindrical interior configuration. Formed in the walls thereof are a pair of longitudinally extending slots 26 and 26a generally parallel to the axis of the aperture 24 and the center of rotation of the driven member 16. The slots 26 and 26a are adapted to mate with the key portions 40 and 40a of the coupling means 34 to receive the rotational force therefrom and to permit lateral movement of the means 34 relative to the driven member 16.

The disconnect means 12 includes the coupling means 34, the temperature responsive solid 56 and the piston means 48. Coupling means 34 is a generally circular cylindrical stub member having radially upstanding longitudinally extending key portions 38 and 38a and 40 and 40a on the periphery thereof separated by a circumferential relief 36, dividing the coupling means into two portions, 34a and 34b. Portion 34a, including the key members 38 and 38a and portion 34, including the key members 40 and 40a are adapted to be positioned in aperture 18 and mate with the slots 20 and 20a of the driving member 14 and to be positioned in aperture 24 and mate with the slots 26 and 26a of the driven member 16, respectively, to transmit rotational force therebetween and permit lateral movement of the coupling means relative thereto. Aperture 18 is of greater depth than portion 34a so that the coupling means 34 may move laterally, in response to actuation, a sufficient distance to disengage it from the driven member 16, as shown in FIGURE 2. A coupling means holding means is provided for holding the coupling means in operable engagement with the driven members prior to the attainment of critical temperatures in the system. This coupling means holding means includes a snap ring 42 which is positioned in cooperating circumferential grooves 28 and 44 in the interior of the aperture 24 and the periphery of the coupling means, respectively.

The coupling means 34 has an aperture 46 of generally circular cylindrical configuration and having an open end facing outwardly to the interior of the aperture 24 of the driven member 16. The coupling means aperture 46 is adapted to receive a portion of the means movable for disengaging the coupling means or piston 48 therein. The remaining portion of piston 48 is positioned in the generally circular cylindrical piston and wax receiving chamber 51 which is formed in the driven member 16 and is a physical extension of reduced diameter of the aperture 24. Piston 48 has a similar circular cylindrical interior cavity 49 facing inwardly to the interior of the driven member 16 and in open communication with the piston and wax receiving chamber 51 thereof.

The interior 49 of the piston 48 and the interior of the piston and wax receiving chamber 51 are filled with a temperature responsive solid 56, such as wax, which is the actuation means for the device of this invention. A small gap 31, exists between the piston wax and the chamber wax to permit solid state expansion without actuation of the device. A retaining shear pin 30 extends radially inward from the walls of the driven member 16 into a circumferential slot 54 in the piston 48 to provide a locking means for locking the movable piston in the driven member prior to actuation thereof in response to the attainment of a critical temperature within the power transmission system. The temperature responsive solid, or wax, which is used in this disconnect device has a melting point at a temperature slightly below the temperature at which damage to the system may be caused. When this temperature, or "critical temperature" is reached, regardless of the speed of the driving and driven members, the wax begins to melt and it expands greatly in volume. The expansion rapidly bridges the gap 31 and the separate wax charges are forced together. The continued expansion produces very high pressure which pushes the piston 48 laterally against the coupling means 34 with a sufficient force to overcome the retention of the pin 30 and break it. The lateral movement of the piston against the coupling means causes the coupling means to be moved laterally and out of operational engagement with the driven member since the force is sufficient to dislodge the snap ring 44 from the circumferential groove 28 in the aperture 24 of the driven member 16. The disconnect device assumes the relation shown in FIGURE 2 and the operational engagement between the driving member and the driven member by means of the coupling means is terminated. Thus the driven member is no longer rotated or driven and comes to rest and is allowed to cool without being damaged from excessive heat within the system.

The ring 52, or retaining means for retaining the temperature responsive solid in the driven member, is positioned in the circumferential groove 50 of the piston 48 to prevent the melted wax from leaking out of the piston and wax receiving chamber 51 upon lateral movement of the piston 48. However, should further high pressure expansion of the wax continue the ring will be forced from the groove, limiting the travel of the piston by causing leakage rather than permitting further expansion. This insures that there will be no end loading on the driving member due to increased lateral movement of the piston 48.

Power transmission systems should be provided with a means for disconnecting the driving and driven members upon receiving a temperature signal so that the internal heat generated will not be allowed to continue and damage components of the system. The device of this invention prevents such damage from occurring by means of the temperature responsive wax solid which melts at a predetermined critical temperature and expands greatly to cause the driven member to be disconnected from the coupling means. The wax uses the temperature within the system for its disengaging actuation and is responsive thereto regardless of the speed of the system elements. The expansion force is limited by a provision for leakage of the melted wax so that no serious end loading of the driving member will occur.

I claim:

1. A thermal disconnect device for use in a power transmission system, comprising: a driving member having an outwardly facing cavity formed therein coaxially with the center of rotation thereof, said cavity having a plurality of longitudinally extending slots formed in the walls thereof; a driven member having an outwardly facing first cavity formed therein coaxially with the axis of the center of rotation thereof, said driven member having a second cavity of reduced diameter formed coaxially with said first cavity and opening thereto, said driven member first cavity being opposed to said driving member cavity and having a plurality of longitudinally extending slots formed in the walls thereof; coupling means comprising a splined stub interconnecting said driving and driven members, said stub being positioned in said driving and driven member cavities and having an exterior configuration for mating therewith including a plurality of radially upstanding key for mating with said slots adapting said stub for lateral movement relative to said driving and driven members to disengage the coupling therebetween, said stub having a cavity formed therein and facing outwardly into said driven member first and second cavities; means laterally movable to disengage said stub comprising a piston in said stub cavity and said driven member second cavity, said piston having a cavity formed therein and facing outwardly into said driven member second cavity; and means for moving said piston comprising a thermally responsive wax core positioned in said piston cavity and said driven member second cavity whereby the presence of critical temperature within said system causes said wax to melt and expand in volume imparting lateral movement to said piston, which in turn moves said stub laterally, to disengage the operable coupling between said driving and driven members.

2. The device of claim 1 including retaining means for retaining said wax in said driven member after the temperature thereof exceeds the predetermined figure and said piston moves in response thereto to disengage said coupling comprising a sealing ring positioned in the periphery of the piston and forming a seal with the walls of the driven member second cavity.

3. The device of claim 1 including locking means for locking said piston in said driven member against movement relative thereto while the temperature thereof remains less than said predetermined figure comprising a shear pin in the wall of said driven member extending radially inwardly into a circumferential groove in said piston.

4. The device of claim 1 including holding means for holding said stub against movement relative to said driving and driven members while the temperature of said device remains less than said predetermined figure comprising a retaining ring positioned in cooperating circumferential grooves in said stub and said driven member first cavity.

5. The device of claim 1 including locking means for locking said piston in said driven member against movement relative thereto while the temperature thereof remains less than said predetermined figure comprising a shear pin in the wall of said driven member extending radially inwardly into a circumferential groove in said piston, and also including retaining means for retaining said wax in the driven member after the temperature thereof exceeds said predetermined figure and said piston moves in response thereto to disengage said coupling comprising a sealing ring positioned in the periphery of the piston and forming a seal in the wall of the driven member second cavity.

6. The device of claim 1 including retaining means for retaining said wax in said driven member after the temperature thereof exceeds said predetermined figure and said piston moves in response thereto to disengage said coupling comprising a sealing ring positioned in the periphery of the piston and forming a seal within the walls of the driven member second cavity; and also including holding means for maintaining said stub in operational engagement with said driven member while the temperature of said device remains less than said predetermined figure comprising a retaining ring positioned in cooperating circumferential grooves in said stub and said driven member first cavity.

7. The device of claim 1 including locking means for locking said piston in said driven member against relative movement thereto while the temperature thereof remains less than said predetermined figure comprising a shear pin in the walls of said driven member extending radially inwardly into a circumferential groove in said piston; also including holding means for holding said stub in operational engagement with the driven member while the temperature of said device remains less than said predetermined figure comprising a retaining ring positioned in cooperating circumferential grooves in said stub and said driven member first cavity.

8. The device of claim 1 including locking means for locking said piston in said driven member against movement relative thereto while the temperature of said device remains less than said predetermined figure comprising a shear pin in the wall of said driven member extending radially inwardly into a circumferential groove in said piston; retaining means for retaining said wax in said driven member after the temperature thereof exceeds said predetermined figure comprising a sealing ring positioned in the periphery of the piston and forming a seal with the walls of the driven member second cavity; and holding means for holding said stub in operational engagement with said driven member against movement relative thereto while the temperature of said device remains less than said predetermined figure comprising a retaining ring positioned in cooperating circumferential grooves in said stub and said driven member first cavity.

9. A thermal disconnect device for use in a power transmission system, comprising: a driving member rotatable about an axis; a driven member rotatable about said axis; coupling means within said driving and driven members for coupling said driven member to said driving member; disengaging means within said coupling means, said disengaging means being adapted for movement to disengage said coupling means; a member for moving said disengaging means to disengage said coupling means including a temperature responsive solid wax core in said disengaging means, said wax being adapted to melt and expand in volume when the transmission temperature exceeds a predetermined figure to cause said disengaging means to move and disengage said coupling means thereby to terminate the operable engagement between said driving and driven members and prevent damage thereto caused by excessive heat in the transmission; and locking means for locking said disengaging means in said driven member against movement relative thereto while the temperature of the transmission remains less than said predetermined figure.

10. The thermal disconnect device of claim 9 including retaining means for retaining the wax in said driven member after the temperature of the transmission exceeds said predetermined figure.

11. The thermal disconnect device of claim 9 including holding means for holding said coupling means in operable engagement with said driven member while the temperature of the transmission remains less than said predetermined figure.

12. The thermal disconnect device of claim 9 including retaining means for retaining the wax in said driven member after the temperature of the transmission exceeds the predetermined figure; and holding means for holding said coupling means in operable engagement with said driven member and against movement relative thereto while the temperature of the transmission remains less than the predetermined figure.

13. A thermal disconnect device for use in a power transmission system, comprising: a driving member; a driven member; coupling means interconnecting said driving and said driven member comprising a splined stub mounted in said members and adapted for lateral movement relative thereto to become disengaged from said driven member; a piston in said driven member adjacent said stub and laterally movable relative to said driven member for disengaging said coupling means; and a temperature responsive solid wax in said driven member adjacent said piston, said wax adapted to move the piston when the temperature of the wax exceeds a predetermined figure to melt the wax and expand the wax in volume, whereby lateral movement is imparted to said piston to move said stub laterally and disengage said stub and driven member; and locking means for locking said piston in said driven member against movement relative thereto while the temperature of the wax remains less than said predetermined figure.

14. The thermal disconnect device of claim 13 including retaining means for retaining said wax in said driven member after the temperature of the wax exceeds said predetermined figure.

15. A thermal disconnect device of claim 13 including holding means for holding said stub in operable engagement with said driven member while the temperature of the wax remains less than said predetermined figure.

16. The thermal disconnect device of claim 13 including retaining means for retaining said wax in said driven member after the temperature of the wax exceeds said predetermined figure; and holding means for holding said stub in operable engagement with said driven member and against movement relative thereto while the temperature of the wax remains less than said predetermined figure.

References Cited by the Examiner
UNITED STATES PATENTS

| | | |
|---|---|---|
| 2,320,900 | 6/43 | Walz. |
| 2,516,269 | 7/50 | Starkey _____ 192—82 X |
| 2,815,916 | 12/57 | Holmes et al. |
| 2,855,769 | 10/58 | Garnier _____ 64—30 |
| 2,974,768 | 3/61 | Hause _____ 192—82 |
| 3,106,343 | 10/63 | Holland. |

DAVID J. WILLIAMOWSKY, *Primary Examiner*.

ROBERT C. RIORDON, *Examiner*.